United States Patent [19]

Adler

[11] 3,868,553

[45] Feb. 25, 1975

[54] POLING OF FERRO-ELECTRIC SUBSTRATES

[75] Inventor: Robert Adler, Northfield, Ill.

[73] Assignee: Zenith Radio Corporation, Chicago, Ill.

[22] Filed: June 27, 1973

[21] Appl. No.: 374,213

Related U.S. Application Data

[62] Division of Ser. No. 196,351, Nov. 8, 1971, Pat. No. 3,761,746.

[52] U.S. Cl. .............. 317/262 F, 310/8, 307/88 ET

[51] Int. Cl. ........................ H04r 17/00, H04r 31/00

[58] Field of Search ..................... 317/262 F; 310/8; 307/88 ET

[56] References Cited

UNITED STATES PATENTS

| | | | |
|---|---|---|---|
| 1,886,234 | 11/1932 | Meissner | 310/8 |
| 1,969,379 | 8/1934 | Meissner | 310/8 |
| 2,384,541 | 9/1945 | Fruth | 310/8 |
| 3,424,953 | 1/1969 | Bean | 310/8 |
| 3,612,778 | 10/1971 | Murphy | 307/88 ET |
| 3,644,605 | 2/1972 | Sessler et al. | 264/24 |

*Primary Examiner*—L. T. Hix
*Attorney, Agent, or Firm*—Nicholas A. Camasto; John J. Pederson

[57] ABSTRACT

Ferro-electric bodies are poled by employing an ionized gas or other medium as a poling electrode.

2 Claims, 1 Drawing Figure

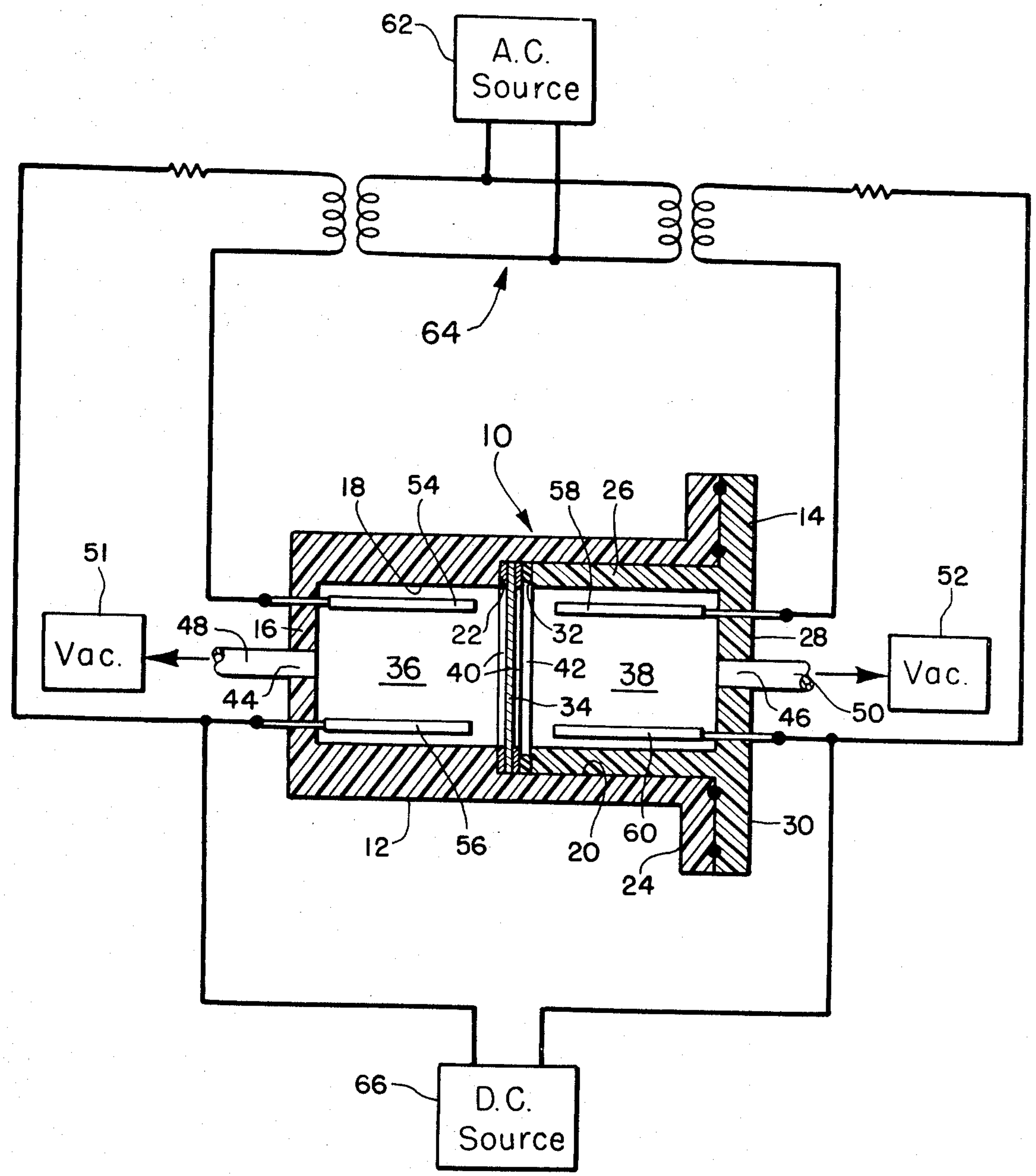
A.C. Source
62
64
10
18
54
58
26
14
51
Vac.
48
16
22
32
28
52
Vac.
36
40
42
38
44
34
46
50
12
56
20
60
30
24
66
D.C. Source

POLING OF FERRO-ELECTRIC SUBSTRATES

RELATED APPLICATION

This application is a division of application Ser. No. 196,351, filed Nov. 8, 1971, and now U.S. Pat. No. 3,761,746, assigned to the assignee of this application.

BACKGROUND OF THE INVENTION

The present invention pertains to ferro-electric elements. More particularly, it relates to methods and apparatus for poling such elements.

In the manufacture of some electro-mechanical transducers, as for example the surface-wave devices of the type disclosed in U.S. Pat. No. 3,582,838, issued June 1, 1971, it is necessary to pole or electrically stress a substrate of ferro-electric material when that material is other than naturally piezoelectric. The usual technique employed in poling ferro-electric wafers is to apply a thin metallic film to each of the appropriate surfaces of the substrate and to employ these conductive films as poling electrodes to which the poling potential is applied. This is satisfactory in applications where the poling electrodes can later serve as operating electrodes. However, when it is desired to generate shearing stresses or complex stress patterns, as in surface wave transducers, operating electrodes having a configuration different from that of the poling electrodes are required. In such cases, it is necessary to remove the poling electrodes after the poling step is completed, usually by an etching technique, before the operating electrodes can be applied to the substrate. In addition to the time consumed in first applying the electrodes, usually by a sputtering technique, and then subsequently removing the metallic film after poling, the surfaces of the substrate to which the film was applied must be painstakingly cleaned of the film and of any by-products of the film-removal process.

It is, accordingly, a general object of the present invention to provide a method and apparatus for poling ferroelectric substrates which does not require the application and subsequent removal of metallic poling electrodes.

Another object of the present invention is to provide a poling method which may be used either before or after the deposition on the substrate of other materials.

SUMMARY OF THE INVENTION

In brief, the present invention contemplates the exposure of opposed surfaces of a ferro-electric substrate to electrically and mechanically isolated ionized regions and the application of a potential difference to the regions for the purposes of poling the substrate. In one form of apparatus for carrying out the invention, the ferro-electric substrate to be poled is mounted within a closed chamber in a manner such that the substrate constitutes an interior wall or diaphragm which divides the interior of the chamber into two subchambers that are electrically and mechanically isolated from each other. The term "mechanically isolated" is employed to mean that the two chambers are mechanically sealed against fluid communication with each other. The substrate is so mounted within the chamber that the two surfaces to which the poling potentials are to be applied define respective walls of the two subchambers. The two subchambers are each connected to a vacuum pump so that a reduced pressure may be maintained therein and each chamber thus contains an isolated body of gas that preferably is of a chemically inert composition. The two bodies of gas are then ionized by the application of a first potential and a DC potential difference is supplied between the two bodies of ionized gas to thus constitute the poling potential.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying Drawing in which the single FIGURE is a schematic diagram, partially in cross-section, of one form of apparatus embodying the present invention.

DESCRIPTION OF THE PREFERRED EMBODIMENT

The apparatus shown in the drawing includes a closed casing 10 made up of two separable chamber elements 12 and 14, both elements being constructed from an electrically non-conductive material. In addition to being electrically non-conductive, it is desired that the material from which chamber elements 12 and 14 are formed be machinable in order that sealing surfaces may be formed with a high degree of precision. Also, it should be chemically inert and possess physical characteristics enabling the completed structure to hold a hard vacuum at temperatures in the neighborhood of 100°C. Any of several commercially available slow curing epoxy resins may be employed for this purpose.

In the form shown in the drawing, chamber elements 12 and 14 may be assumed to be of cylindrical configuration. Element 12 is closed at one end as at 16 and its hollow interior is defined by a reduced diameter section 18 and an enlarged diameter section 20 with a radial seating shoulder 22 located between the reduced and enlarged diameter sections 18 and 20. An outwardly projecting sealing flange 24 is integrally formed at the right-hand end of element 12.

Element 14 is formed with a hollow cylindrical section 26 whose outer diameter is chosen to provide a sliding-sealing fit within enlarged diameter section 20 of element 12. The right-hand end of cylindrical section 26 is closed by an integrally formed cover 28 having an outwardly projecting annular sealing flange 30 adapted to mate in flat face-to-face engagement with sealing flange 24 on element 12. When the two casing elements 12 and 14 are in their closed position shown in the drawing, the axial length of cylindrical section 26 is somewhat shorter than the axial length of reduced diameter section 20 on casing element 12 so that the inner end 32 of member 14 is axially spaced from shoulder 22 on element 12.

A ferro-electric body in the form of wafer 34, which is to be poled by the apparatus, is sealingly clamped in the illustrated position during the poling operation. For proper performance, it is necessary that wafer 34 be mounted within casing assembly 10 in a manner such that the two resulting subchambers 36 and 38 on opposite sides of wafer 34 are mechanically isolated so as to be sealed against fluid communication with each other and are also electrically isolated from each other. To this end, annular washers 40, of a material having a high dielectric strength, are located one on each side of wafer 34, and an O-ring seal 42 is located between the inner end 32 of element 14 and the adjacent dielectric washer. Suitable clamping means, not shown, may be employed to mechanically clamp the two casing elements 12 and 14 in the closed position shown in the Drawing Each of subchambers 36 and 38 has an outlet port 44, 46, respectively. These ports are connected via conduits 48 and 50 to suitable vacuum pumps 51 and 52 which are employed to establish the desired degree of vacuum in the respective subchambers during the poling operation.

First and second pairs of electrodes 54, 56 and 58, 60, of a material such as nickel or graphite, are mounted respectively in subchambers 36 and 38, each electrode pair being connected to a suitable AC power source 62 through appropriate circuitry designated generally 64 and which maintains electrical isolation between electrodes 54, 56 and 68, 70. A DC or unidirectional power source 66 is connected across one electrode 56, 60 of each pair.

After the apparatus and wafer are assembled as shown, subchambers 36 and 38 are evacuated to a relatively low pressure compared to atmospheric pressure and AC source 62 is energized to produce a glow discharge in the respective chambers by ionizing the residual gas therein. The ionized gas is highly conductive and essentially gradient free in the axial direction through the wafer. Energization of DC source 66 then applies a potential difference between the ionized gas in each of subchambers 36 and 38 so as to constitute the poling potential. Because the opposed faces of wafer 34 are completely and directly exposed to the isolated bodies of ionized gas respectively contained in subchambers 36 and 38, the ionized gas in each functions as a poling electrode.

Experience with an apparatus similar to that schematically shown in the drawings has revealed that glow discharges of the type needed (where the residual gas is air) can be maintained over wide ranges of pressure and ionizing voltages. Pressure ranges from between one- and two-hundred microns and voltage ranges from three- to eight-hundred volts AC have been successfully employed. It may be noted that the objective of ionizing the residual gas in subchambers 36 and 38 can be achieved by other techniques and apparatus. For example, the ions on either or both sides of wafer 34 may be generated by a radio-active material or by a radiofrequency field. Moreover, the shape of the ionizing electrodes is not critical so long as the AC field gradient on the surface of the wafer is insufficient to result in sputtering of the electrode material. For increased ionizing capability, the electrodes may be interleaved. Further, a noble gas atmosphere may be used instead of residual air. In any event, the degree of ionization need not be great. For the apparatus shown, only a few micro-amperes of ionizing current is required.

In one typical example of operation of the apparatus shown in the drawing, a ferro-electric PZT ceramic disc of 0.020 inch thickness, polished on both faces, was exposed for thirty minutes to a two-kilovolt DC potential difference between subchambers 36 and 38 and was thereafter found to exhibit an electromechanical coupling factor of 0.23. In this case the residual gas in subchambers 36 and 38 was air and the poling operation was performed at room temperature (25°C. to 30°C.). The time required may be substantially reduced by increasing the applied DC poling voltage, and higher coupling factors are achieved when operating the process at higher temperatures such as in the neighborhood of 100°C.

Whatever the particular arrangement, it is essential that the ionized regions in subchambers 36 and 38 be both electrically and mechanically isolated from each other. The degree of mechanical isolation required is only that sufficient to prevent a DC gas discharge. In order to achieve this, and particularly to enable the employment of relatively high poling potentials, some degree of care is necessary in order to achieve a good electric seal for preventing electrical leakage around the edges of wafer 34. When using a very high DC poling potential, it may even be necessary to seal the wafer in place with a high-dielectric material such as that from which casing 10 itself is made. At these high potentials, arcing or breakdown also may occur through the vacuum lines when the two chambers are Y-connected to a single vacuum pump if the Y-joint is not sufficiently distant from the respective subchambers. Of course, it also is for this reason that the two bodies of gas respectively contained in subchambers 36 and 38 are ionized by separate means in a manner such that they are isolated electrically from each other.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. Apparatus for poling a ferro-electric body comprising:

a hollow casing assembly;

support means in said casing assembly for mounting a ferro-electric body in the interior of said casing to divide said interior into two mechanically isolated subchambers;

sealing means for electrically isolating said subchambers from each other;

ionizing means for establishing an ionization region in each of said subchambers;

and means for establishing a unidirectional electric potential difference between the ionization regions in the respective subchambers.

2. Apparatus as defined in claim 1, wherein said ionizing means comprises:

vacuum means connected to each of said subchambers for reducing the pressure in each chamber to establish a body of residual gas therein at substantially less than atmospheric pressure;

a pair of spaced electrodes mounted in each chamber;

and an AC power source connected to each of said electrode pairs for establishing a glow discharge in each of said subchambers.

* * * * *